United States Patent
Giard

(12)
(10) Patent No.: US 6,329,768 B1
(45) Date of Patent: Dec. 11, 2001

(54) PROCESS FOR CORRECTING PICTURE DEFORMATION AND DEVICE IMPLEMENTING THIS PROCESS

(75) Inventor: Olivier Giard, Grenoble (FR)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/241,475

(22) Filed: Feb. 2, 1999

(30) Foreign Application Priority Data

Feb. 27, 1998 (FR) .................................................. 98 02403

(51) Int. Cl.$^7$ ....................................................... G09G 1/04
(52) U.S. Cl. ............................................. 315/370; 315/371
(58) Field of Search ..................................... 315/370, 371

(56) References Cited

U.S. PATENT DOCUMENTS

| | | | |
|---|---|---|---|
| 4,563,618 | * | 1/1986 | Haferi ................................... 315/370 |
| 4,645,985 | * | 2/1987 | Dietz .................................... 315/371 |
| 5,420,483 | | 5/1995 | Suzuki et al. ......................... 315/371 |
| 6,060,846 | * | 5/2000 | Bergmans et al. .................... 315/371 |
| 6,124,685 | * | 9/2000 | Toriu et al. ........................... 315/370 |

FOREIGN PATENT DOCUMENTS 0664644    7/1995   (EP) .

OTHER PUBLICATIONS

Search Report for French Patent Appln. No. 9802403.
JP 55–000671A: Patents Abstracts of Japan, E–001, Mar. 8, 1980, vol. 004, No. 028, Jan. 7, 1980.
IEEE Transactions on Consumer Electronics, vol. 41, No. 3, Aug. 1, 1995, pp. 536–539.

* cited by examiner

*Primary Examiner*—Don Wong
*Assistant Examiner*—Shih-Chao Chen
(74) *Attorney, Agent, or Firm*—Joseph S. Tripoli; Joseph J. Laks; Daniel E. Sragow

(57) ABSTRACT

To facilitate the adjustment of the S correction in apparatus comprising cathode-ray tubes (televisions, monitors), the process consists in displaying visual marks on the screen, at the location of the picture points which remain stationary as the amplitude of the S correction which is applied to the sawtooth current flowing through the deflection coils of the cathode-ray tube is varied.

16 Claims, 4 Drawing Sheets

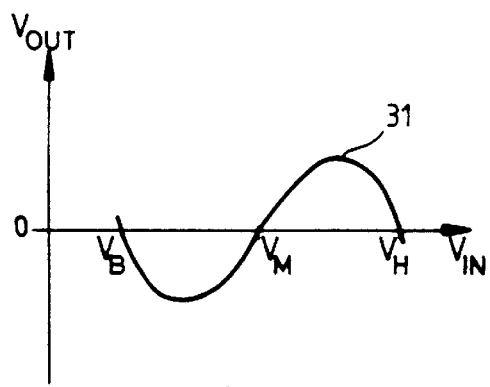
FIG. 4
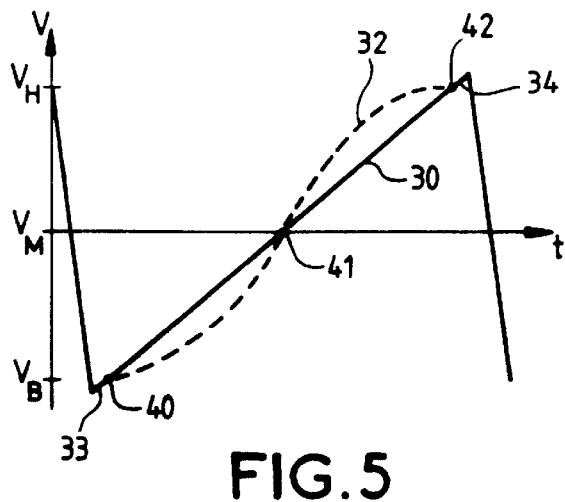
FIG. 5
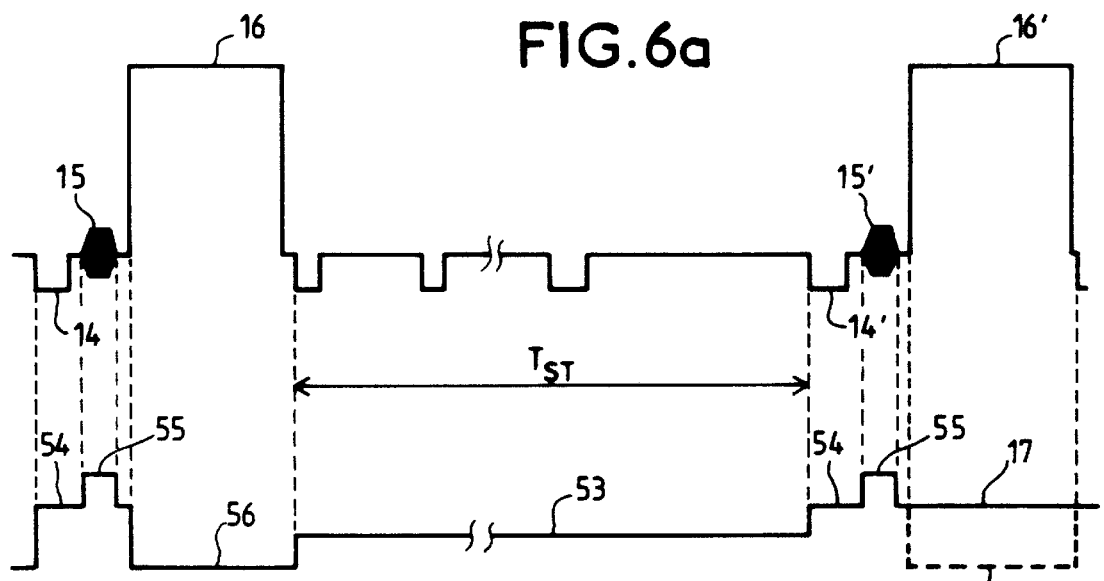
FIG. 6a
FIG. 6b

PROCESS FOR CORRECTING PICTURE DEFORMATION AND DEVICE IMPLEMENTING THIS PROCESS

BACKGROUND OF THE INVENTION

1. Field of the Invention:

The present invention relates to a process for correction of the deformation of a picture formed by a cathode-ray tube and a device implementing this process. It relates more particularly to the adjusting of the S correction in a television set.

2. Description of the Related Art:

Cathode-ray tubes are presently the most commonly used display elements in television sets. Represented diagrammatically in FIG. 1a is a television 6 comprising a conventional cathode-ray tube. The latter comprises an electron gun 1 which produces an electron beam 2 which is accelerated and focused onto a luminescent screen 3 to form a point of the picture. Deflection coils 4, outside the tube, deflect the electron beam electromagnetically so as to scan the screen and form a complete picture.

Let us recall that a television picture is generally formed of two fields, even and odd, and that the electron beam scans the screen twice from top to bottom and from left to right in order to display a complete picture.

In what follows we shall be interested solely in the vertical deflection of the electron beam.

In FIG. 1c we have represented the current flowing through the coils 4 of the vertical deflector. The general shape of this signal is that of a sawtooth whose rising segments 8 correspond to the scanning of the screen by the electron beam from top to bottom (the active part of the picture), and whose segments 9 correspond to the return of the electron beam to the top of the screen (field blanking interval), the video signal sending a black level to the screen throughout the duration of the segment 9 (the inactive part of the picture). The duration of time between the start of a segment 8 and the end of a consecutive segment 9 is equal to the duration of a field.

Returning to FIG. 1a, it may be noted that the distance between the electron gun 1 and the surface of the screen 3 is not constant: it increases as we travel from the centre of the screen towards the top or the bottom. Indeed, in recent cathode-ray tubes termed "flat screens" the radius of curvature of the screen 3 onto which the electron beam 2 is projected is much greater than the radius of curvature R between the centre of deflection C of the electron beam and its theoretical surface of projection 5.

The consequences of this are that, when no correction is made, the picture which appears on the screen 3 is deformed, especially at the top and bottom of the picture. Thus, if a test pattern having equidistant horizontal lines is projected onto the screen, a picture such as that represented in FIG. 1b is obtained in which the gap between the lines is greater at the top and bottom of the picture than in the middle.

To correct this phenomenon, it is known practice to apply a current to the coils of the vertical deflector, not a perfect sawtooth current, as represented in FIG. 1c, but one in which the sawtooth exhibits "S"-shaped portions 18, as represented in FIG. 1e. This correction is dubbed "S correction". The image obtained when the correction is optimal is represented in FIG. 1d.

This S correction must be set at the end of the television production line by altering the amplitude of the "S" shape of the portions 18 relative to the uncorrected shape of the sawtooth 8'. During this adjustment, three points 10, 11, 12 of the portion 18 of the curve are not modified by the changes of amplitude of the S correction, these points will be called the fixed points of the S correction hereinafter.

In order for the correction of the picture to be optimal, it is also necessary for the S correction to be centred relative to the screen. That is to say, at the instants at which the sawtooth current passes respectively through the points 10, 11 and 12, the electron beam must scan the first line, the middle line and the last line of the screen respectively.

Moreover, in certain television receivers it is known practice to generate a few overscan lines at the top and bottom of the screen, these lines being used to perform tests. For example, these lines can be used to transmit colour information and to carry out auto-regulation of the colour temperature.

These overscan lines must not of course be displayed on the screen since they carry no information relating to the "useful" television picture transmitted. Hence, an adjustment must be made at the end of the television manufacturing line such that the electron beam does not scan the surface of the screen during these overscan lines.

Hence, at the end of a television receiver production line an operator must adjust a number of parameters: the position of the overscan lines, the position and amplitude of the S correction, etc.

In practice, he proceeds as follows:

firstly he dispatches a test pattern to the television, termed the convergence pattern and composed of a grid of equidistant lines, and he marks the zones of the picture which correspond to the fixed points of the S correction, that is to say he modifies the amplitude of the S correction so as to view on the screen those lines which remain still;

once the position of these lines has been marked, he must secondly position them at the top, middle and bottom of the screen respectively by adjusting the amplitude and the offset of the sawtooth current flowing through the coils of the deflector; the purpose of this is to centre the fixed points of the S correction with respect to the picture formed on the screen and this makes it possible furthermore to avoid displaying the overscan lines on the screen;

thirdly, he must readjust the amplitude of the S correction until the lines of the grid pattern appear equidistant on the screen.

SUMMARY OF THE INVENTION

This series of adjustments turns out to be fairly lengthy and an object of the invention is to simplify these operations in such a way as to reduce the time required to adjust each television set.

To this end, the subject of the invention is a process for S correction of the deformation of a picture formed by a cathode-ray tube, the amplitude of the S correction applied to the sawtooth current flowing through the deflection coils of the cathode-ray tube being variable. According to the invention, the process comprises the step of displaying visual marks on the screen at the location of the picture points which remain stationary as the amplitude of the S correction is varied.

By virtue of the invention, the first step of the above-described adjustment performed at the end of production is eliminated since the operator directly views the position of the zones of the picture corresponding to the fixed points of the S correction. Moreover, this marking is more accurate than in the prior art since it does not depend on the operators subjective perception of the position of the lines of the convergence pattern.

According to one aspect of the invention, the visual marks displayed are black lines.

It is thus sufficient for the operator to dispatch for example a white test pattern to the screen so as easily to mark the black lines corresponding to the fixed points of the S correction.

According to a particular embodiment, the step of displaying visual marks comprises:

the generation of pulses whose duration is at least equal to a video line at the instants at which the curve of the current flowing through the deflection coils passes through points, termed the "fixed points" of the S correction, which are not affected by the variation in amplitude of said S correction; and the insertion of said pulses into the "Super Sand Castle" signal generated by the circuit controlling the scanning of the cathode-ray tube, said pulses indicating the position of those lines for which a black level is to be displayed on the screen.

Thus, the invention is implemented using a signal which already exists in the scan control circuit, the "Super Sand Castle" signal, which is generated, inter alia, so as to compel the video processor to deliver a black level to the electron guns of the cathode-ray tube during the line flybacks and field blanking intervals of the electron beam.

According to one aspect of the invention, the visual marks displayed are coloured lines.

This provides the operator with more attractive additional display capabilities.

According to another particular embodiment, the step of displaying visual marks comprises:

the generation of pulses whose duration is at least equal to a video line at the instants at which the curve of the current flowing through the deflection coils passes through points, termed the "fixed points" of the S correction, which are not affected by the variation in amplitude of said S correction; and the insertion of said pulses into the text insertion signal generated by a character generator so as to control the displaying of characters at the locations of the picture corresponding to said fixed points of the S correction.

Thus, according to this embodiment, the invention is implemented using another pre-existing signal: the text insertion signal which is customarily used to insert text into a video signal.

It is another advantage of the present invention that it can be implemented very easily using circuits and signals which already exist in television sets.

According to a preferred aspect of the invention, the process is applied to the S correction in the vertical deflection circuit of the cathode-ray tube.

The invention also relates to a device for the S correction of the deformation of a picture formed by a cathode-ray tube, implementing the process described above, and comprising:

a sawtooth signal generator whose output is linked to the input of an S correction sinusoid generator, which also receives reference voltages as input and which outputs an S correction sinusoid which vanishes for input voltage values which are equal to the reference voltages, means for adding together the sawtooth signal delivered by the generator and said S correction sinusoid, means for comparing the sawtooth signal with each respectively of the reference voltages and for generating pulses at the instants at which the sawtooth signal passes respectively through each of the reference voltages; and means for displaying, as a function of the signal received containing said pulses, visual marks on the screen, at the location of the picture points which are not affected by the variation in amplitude of said S correction.

The invention also relates to a television set with cathode-ray tube comprising an S correction device as described above.

BRIEF DESCRIPTION OF THE DRAWINGS

Other characteristics and advantages of the invention will emerge through the following description of two particular non-limiting embodiments of the invention given with reference to the appended figures in which:

FIG. 4 represents the transfer function of a circuit element of the device of FIG. 2;

FIG. 5 represents the profile of certain signals generated by the device of FIG. 2;

FIGS. 6a and 6b respectively represent the profile of a video signal and of a so-called "Super Sand Castle" signal generated by the device of FIG. 3a.

DESCRIPTION OF THE PREFERRED EMBODIMENTS

Figure 1A:
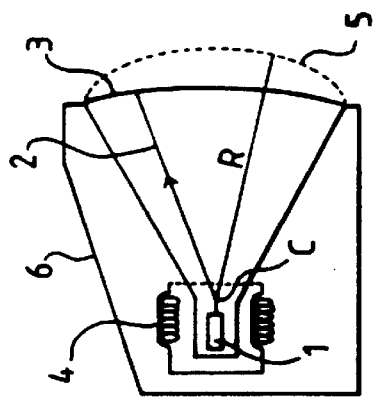
FIG. 1a, described above, diagrammatically represents a television set comprising a cathode-ray tube.
Figure 1B:
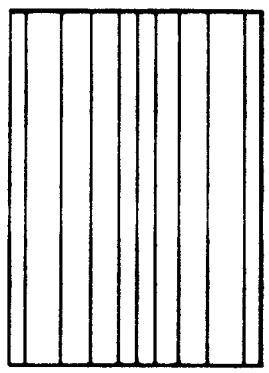
FIG. 1b, described above, shows the appearance on the screen of a picture corresponding to a test pattern of equidistant lines when no correction is made.
Figure 1C:
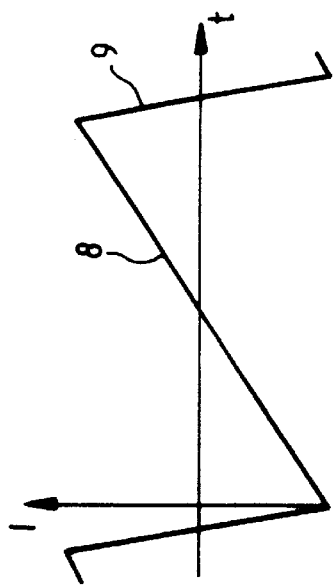
FIG. 1c, described above, represents the current flowing through the coils of the vertical deflector in the absence of any correction.
Figure 1D:
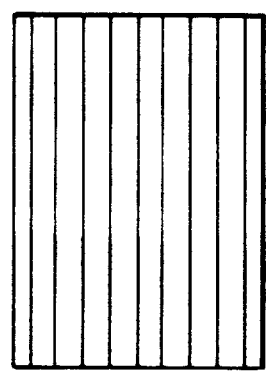
FIG. 1d, described above, shows the appearance on the screen of the same picture as in FIG. 1b with an S correction.
Figure 1E:
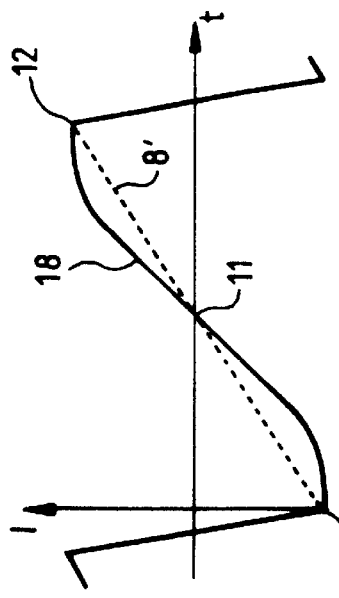
FIG. 1e, described above, represents the current flowing through the coils of the vertical deflector, with an S correction.
Figure 2:
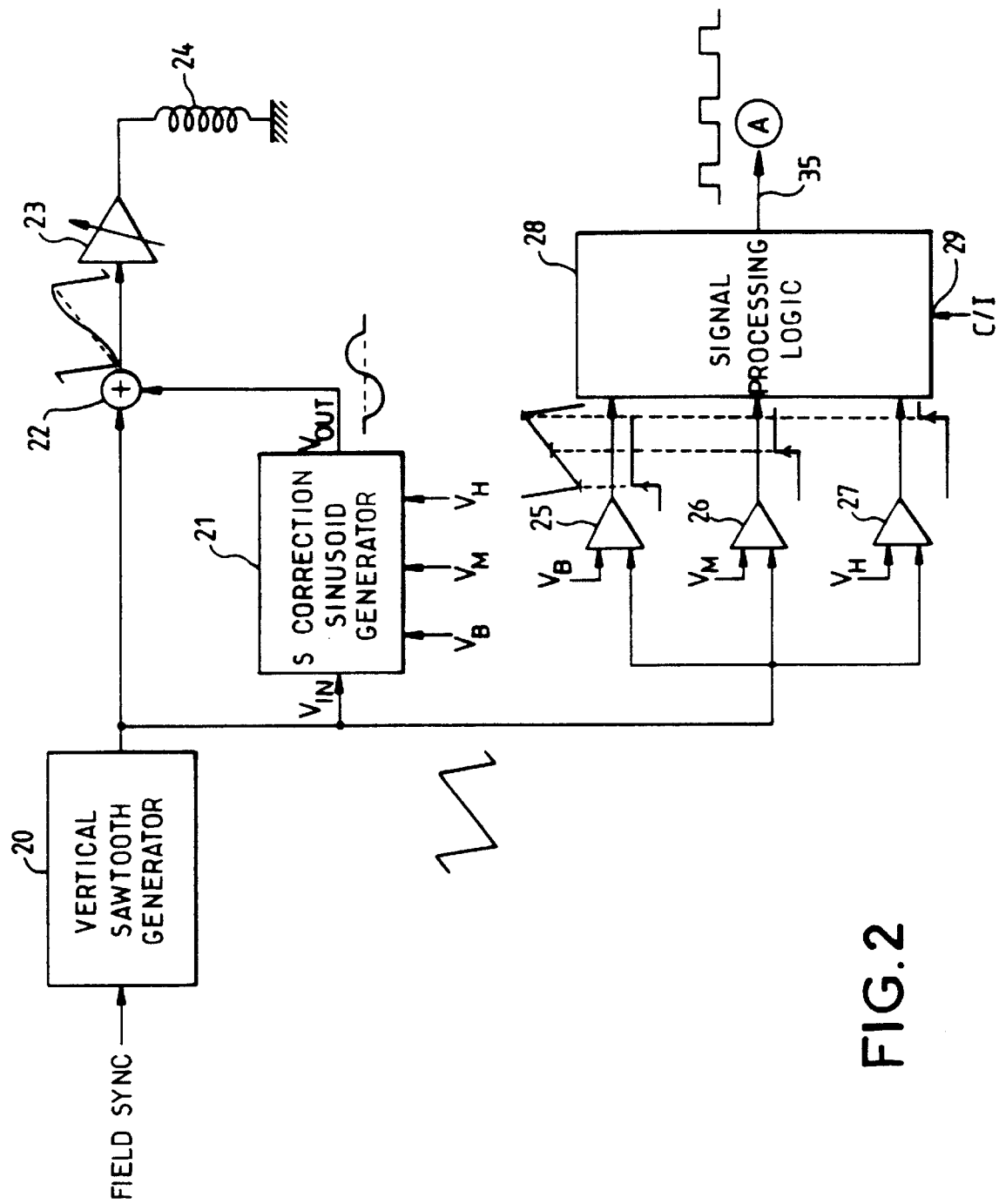
FIG. 2 diagrammatically represents a first part of a device implementing the invention.

FIG. 2 represents a part of a circuit for controlling the vertical scan, also termed the field scan, of a cathode-ray tube. The function of this circuit is to deflect the electron beam vertically in synchronism with the video signal received.

This circuit comprises a vertical sawtooth generator 20 controlled by the field synchronization signal arising from the video signal received by the television set. The vertical sawtooth generator is generally formed, as is known to the person skilled in the art, by placing in series a current source and a switch controlled by the vertical synchronisation cues (or field synchronization cues), a capacitor mounted in parallel with the switch making it possible to produce the sawtooth by charging up and discharging.

The signal present at the output of the sawtooth generator 20 is dispatched to the input $V_{IN}$ of an S correction sinusoid generator 21. This generator has a transfer function such as that represented in FIG. 4. On its output $V_{OUT}$ it generates a sinusoid 31 which vanishes for three voltage values $V_B$, $V_M$ and $V_H$ received on its input $V_{IN}$ and which exhibits a negative value between $V_B$ and $V_M$ and a positive value between $V_M$ and $V_H$. The reference voltages $V_B$, $V_M$ and $V_H$ delivered to the sinusoid generator 21 are chosen by construction to be such that $V_B$ is greater than the minimum voltage of the sawtooth 30 generated by the generator 20 (represented in FIG. 5) and that $V_H$ is less than the maximum voltage of said sawtooth 30, $V_M$ corresponding approximately to the voltage in the middle of the sawtooth 30. Their values are for example $V_B$=3 volts, $V_M$=4 volts and $V_H$=5 volts. These voltage values correspond, as will be seen later, to the bottom position, to the middle position and to the top position of what was referred to above as the fixed points of the S correction. The amplitude of the sinusoid can be adjusted in a manner known per se.

An adder 22 sums the sawtooth 30 generated by the generator 20 and the sinusoid generated by the generator 21. The signal resulting from this summation, represented by dashes 32 in FIG. 5, is a sawtooth whose segment of smallest slope exhibits the general shape of an "S".

S This signal is transmitted to a variable-gain voltage/current amplifier 23 which delivers the current having an S correction to the coils 24 of the vertical deflector of the cathode-ray tube. By adjusting the gain of the amplifier 23 it is possible to adjust the size of the picture on the screen, expanding it to a greater or lesser degree in the vertical direction. There is also provision to adjust the offset of the current delivered to the coils of the vertical deflector so as to shift the picture on the screen vertically, in such a way as to centre it.

It may be observed that when the S correction sinusoid generated by the generator 21 is added to the sawtooth generated by the generator 20, certain points on the resulting curve 32 are not modified relative to the initial sawtooth 30. These points labelled 40, 41 and 42 in FIG. 5 are for this reason referred to as the fixed points of the S correction.

Indeed, in the picture formed on the screen of the cathode-ray tube, the zones of the picture which correspond to these fixed points of the sawtooth current flowing through the coils of the deflector are not modified when the operator adjusts the amplitude of the S correction (that is to say the amplitude of the sinusoid).

Moreover, it may also be noted that two portions 33, 34, situated respectively beneath the bottom fixed point 40 and above the top fixed point 42 of the segment of smaller slope of the sawtooth 30, are also not affected by adding the sinusoid. These portions correspond to the overscan lines which are not to be displayed on the screen. This is why the top and bottom fixed points of the S correction should correspond exactly to the first and to the last line displayed on the screen.

According to the invention, the zones of the picture corresponding to the fixed points of the "S" correction are marked on the screen by an appropriate display when the operator adjusts the S correction.

To do this, returning to FIG. 2, the sawtooth generated by the generator 20 is dispatched to the input of three comparators 25, 26, 27 which each receive the reference voltages $V_B$, $V_M$ and $V_H$ respectively on their second input. These voltages are the same as those which are delivered to the sinusoid generator 21.

Each comparator 25, 26, 27 outputs a voltage strobe exhibiting a rising edge at the instant at which the sawtooth passes respectively through the voltage values $V_B$, $V_M$ and $V_H$. These instants correspond, as seen above, to the instants at which the sawtooth passes through the fixed points of the S correction.

The strobes delivered by the comparators 25, 26, 27 are dispatched to the input of a signal processing logic circuit 28 which outputs a signal 35 exhibiting pulses having a duration of one line with each rising edge of a strobe input.

This signal 35 is a periodic signal whose period is equal to the duration of one field of a video signal and which comprises, within each period, three pulses of duration equal to one line. This signal will be used to mark on the screen the zones of the picture corresponding to the fixed points of the S correction.

Furthermore, an input 29 is provided in the signal processing logic circuit 28 to dispatch a signal C/I for turning on or turning off the generation of the signal 35. Depending on the value (0 or 1) of the signal C/I received on the input 29, the signal 35 will or will not be generated. Indeed, when the television operates normally, the marks of the fixed points should not be displayed on the screen so as not to disturb the picture displayed.

According to a first embodiment, the pulses of duration equal to one line of the signal 35 will be added to a signal referred to as a "Super Sand Castle" on account of its crenellated profile.

The "Super Sand Castle" signal is a signal which is generated in a known manner in scan control circuits and which is used, inter alia, to inform the video processor of the moments of line flyback or field flyback of the electron beam, also referred to as the line blanking time and field blanking time, during which a black level is to be dispatched to the screen.

An example of a "Super Sand Castle" signal has been represented in FIG. 6b. This signal is formed from a video signal represented in FIG. 6a. The video signal comprises line synchronization pulses 14, 14' at the start of each video line, these being followed by bursts 15, 15'. The role of the burst is to transmit, in the video signal, a phase reference and frequency reference for the chrominance sub-carrier of the composite video signal. The video signal next comprises a part 16 which corresponds to the active part of the picture which will be displayed on the screen. In the present example, this is a white line since the signal is at its maximum level. The period commencing at the start of the line synchronization pulse 14 and terminating at the start of the active part 16 of the line is called the line blanking interval.

During the period labelled $T_{ST}$, a number of pulses regulate the field blanking period. This period corresponds to the time required for the electron beam to climb to the top of the screen once it has scanned the screen from top to bottom during a field.

During the line blanking and field blanking periods, the video should display a black level so that the trace of the electron beam is not visible.

To do this, it is known practice to generate line blanking and field blanking signals comprising strobes of duration equal to the line and field blanking times. It is furthermore known practice to generate burst gate pulses over the duration of the burst 15, 15' so as to extract the chrominance-related information from the video signal.

By adding together the strobes of the line blanking, field blanking and burst gate signals, a signal with three levels is obtained: the "Super Sand Castle" signal.

FIG. 6b shows the profile of the "Super Sand Castle" signal obtained. It exhibits a porch 53 corresponding to the field blanking level, porches 54, having a level greater than the field blanking level, corresponding to the line blanking level, and porches 55, having a level greater than the line blanking level, corresponding to the burst gate. This is why this signal is sometimes also called a "Sand Castle" signal with three levels. The "Super Sand Castle" signal, which is transmitted to the video processor, is compared with a reference voltage whose level lies between the zero level and the field blanking level 53. Depending on this comparison, the video processor displays a black level on the screen, whenever the "Super Sand Castle" signal passes through one of the porches 53, 54, 55 mentioned above which are greater than said reference voltage. By contrast, when the "Super Sand Castle" signal is at its zero level 56, below said reference voltage, the video signal received is displayed on the screen.

According to the invention, the signal 35 (FIG. 2) containing the pulses indicating the position of the fixed points of the S correction is added to the "Super Sand Castle" signal. In FIG. 6*b* it can therefore be seen that a line blanking pulse 17 has been inserted into the "Super Sand Castle" signal instead of the level 19 which it should have had. This pulse 17 informs the video processor that it should not display the video line 16' and that it should display a black level instead.

The operator, by dispatching a white test pattern to the screen of the television, that is to say a video signal making it possible to display solely white lines, will therefore be able accurately to view the position of the locations of the picture corresponding to the fixed points of the S correction since a black line will be displayed at each of these locations.

To adjust the positioning of the S correction, it will therefore be sufficient for the operator to modify the amplitude (by modifying the gain of the amplifier 23) and the offset of the current dispatched to the coils of the vertical deflector until the black lines corresponding to the locations of the fixed points of the S correction are positioned at the bottom, in the middle and at the top of the screen.

The adjustment achieved is thus faster and more accurate than in the prior art since the operator continuously views the lines portraying the position of the fixed points on the screen.

Figure 3A:
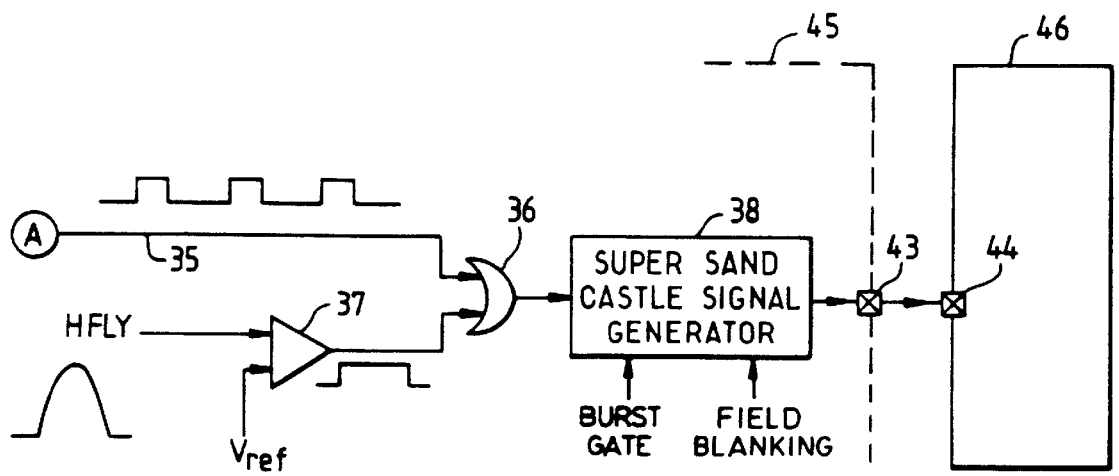
FIGS. 3a and 3b diagrammatically represent two embodiments of a second part of a device implementing the invention.

FIG. 3*a* illustrates a way of obtaining the modified "Super Sand Castle" signal described above.

On a first input, a logic OR gate 36 receives the signal 35 arising from the signal processing logic circuit 28 (FIG. 2) and comprising the pulses for positioning the fixed points of the S correction and, on a second input, it receives the output from a comparator 37.

On a first of its inputs, the comparator 37 receives a signal HFLY (standing for "Horizontal Flyback") containing parabolic line flyback pulses which are generated in a known manner by the horizontal scan control circuit and whose duration corresponds to the line flyback interval. The second input of the comparator 37 receives a reference voltage $V_{ref}$ chosen to be close to the minimum value of the pulses of the signal HFLY so that the comparator 37 outputs a logic signal comprising strobes of duration equal to the line flyback interval.

The output of the logic OR gate 36 is linked to a first input of a "Super Sand Castle" signal generator 38 which also receives, on two other inputs, on the one hand the burst gate signal and on the other hand the field blanking signal (which were defined above).

The "Super Sand Castle" signal generator 38 delivers the modified "Super Sand Castle" signal to an output pin 43 of the scan control processor 45 (represented partially in FIG. 3*a*), which pin is linked to an input pin 44 of the video processor 46.

Figure 3B:
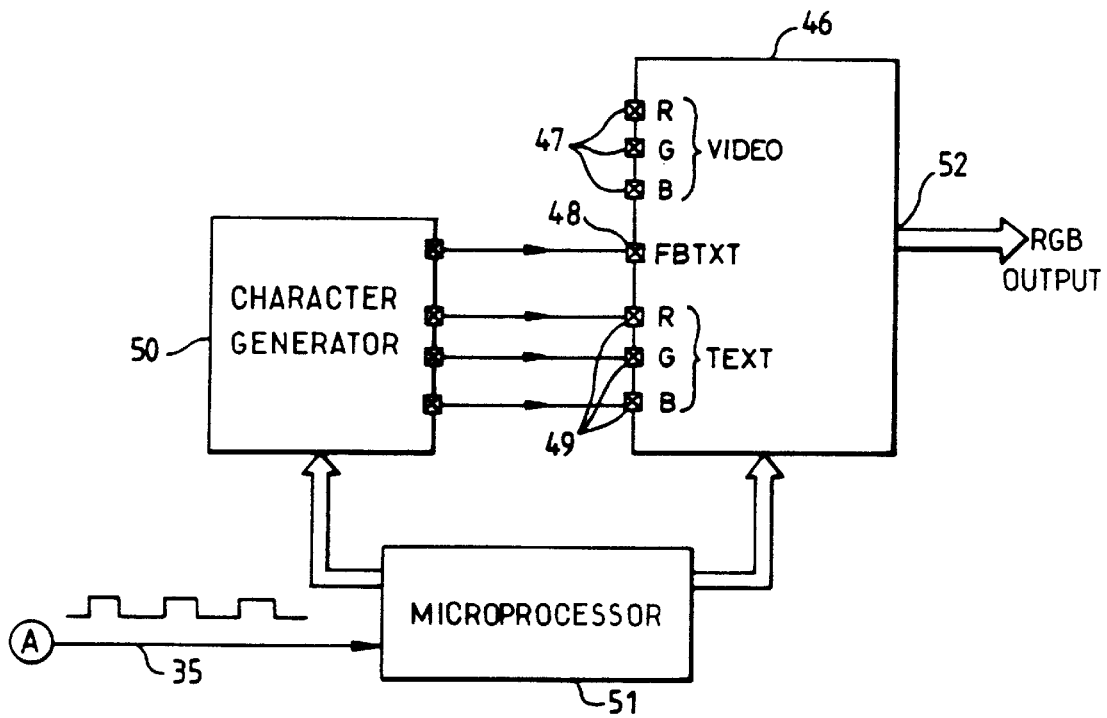

FIG. 3*b* illustrates a second embodiment of the invention, in which the signal 35 containing the pulses indicating the position of the fixed points of the S correction is used to control the displaying of particular characters on the screen so as to mark the position of the zones of the picture corresponding to said fixed points.

The signal 35 is dispatched to one of the inputs of a microprocessor 51 which controls both the video processor 46 and a character generator 50, which is also sometimes referred to as an OSD generator (standing for "On Screen Display").

The video processor 46 comprises on the one hand three RGB video inputs 47 which receive the RGB signals emanating from the composite video signal decoder (for example a PAL or SECAM decoder) of a television set or emanating from a video recorder. During normal operation, these RGB video signals are transmitted to the RGB output 52 which controls the electron guns (one per colour) of the cathode-ray tube.

The video processor 46 additionally comprises three RGB Text inputs 49 which are linked to the corresponding outputs of the character generator 50 as well as a FBTXT (standing for "Fast Blanking Text" or "fast text insertion") input 48 which receives a text insertion signal likewise generated by the character generator 50, which makes it possible to transmit to the RGB output 52 of the video processor, the RGB Text signals received on its inputs 49 instead of the RGB video signals.

This makes it possible, as is known, to insert text generated by the character generator 50 into a video image.

According to the second embodiment of the invention, the microprocessor 51 instructs the character generator 50 to insert the pulses of the signal 35 into the text insertion signal which is dispatched to the FBTXT input of the video processor 46 so as to force the video processor to display, a coloured line for example, at the locations of the picture corresponding to the fixed points of the S correction.

The coloured lines are generated in a manner known per se by the character generator 50 but any other display capability can be envisaged (arrow, text, etc.).

Of course, the invention is not limited to the embodiments described above and encompasses all variants. In particular, the signal 35 can have pulses of longer duration than the duration of one line, for example it can comprise pulses with a duration of two or three lines. It can also comprise pulses with a duration of less than one line, in particular in the second embodiment.

The invention applies also to cathode-ray tubes in which scanning is continuous (such as those present in video monitors) rather than interlaced (with an even and odd field forming a picture).

What is claimed is:

1. A process for S correction of the deformation of a picture formed by a cathode-ray tube, the amplitude of the S correction current applied to the sawtooth current flowing through the deflection coils of the cathode-ray tube being variable, comprising the step of displaying visual marks on a screen at the location of the picture points which remain stationary as the amplitude of said S correction current is varied, wherein the step of displaying visual marks comprises:
   the generation of pulses whose duration is at least equal to a video line at the instants at which the curve of the current flowing through the deflection coils passes through points, termed the "fixed points" of the S correction, which are not affected by the variation in amplitude of said S correction; and the insertion of said pulses into a "Super Sand Castle" signal generated by the circuit controlling the scanning of the cathode-ray tube, said pulses indicating the position of those lines for which a black level is to be displayed on the screen.

2. A process for S correction of the deformation of a picture formed by a cathode-ray tube, the amplitude of the S correction current applied to the sawtooth current flowing through the deflection coils of the cathode-ray tube being variable, comprising the step of displaying visual marks on a screen at the location of the picture points which remain stationary as the amplitude of said S correction circuit is varied, wherein the step of displaying visual marks comprises:

the generation of pulses whose duration is at least equal to a video line at the instants at which the curve of the current flowing through the deflection coils passes through points, termed the "fixed points" of the S correction, which are not affected by the variation in amplitude of said S correction, and the insertion of said pulses into the text insertion signal generated by a character generator so as to control the displaying of characters at the locations of the picture corresponding to said fixed points of the S correction.

3. A device for the S distortion correction of the deformation of a picture formed by a cathode-ray tube, comprising means for generating the display of visual marks at the location of picture points which are not affected by said S distortion correction.

4. The device according to claim 3, wherein the means for generating the display of visual marks comprise:

a saw tooth signal generator whose output is linked to the input of an S distortion correction sinusoidal signal generator, which also receives reference voltages as input and which outputs an S distortion correction sinusoidal signal which vanishes for input voltage values which are equal to the reference voltages, means for adding together the saw tooth signal delivered by the generator and said S distortion correction sinusoidal signal, said addition resulting in a combined signal, means for comparing the saw tooth signal with each respectively of the reference voltages and for generating a signal containing pulses, said pulses being generated at the instants at which the sawtooth signal passes respectively through each of the reference voltages; and means for displaying, as a function of the signal received containing said pulses, visual marks on the cathode-ray tube, at the location of the picture points which are not affected by variations in amplitude of said sinusoidal signal.

5. The device according to claim 4, comprising a "Super Sand Castle" signal generator which receives line blanking strobes, field blanking strobes and burst gate strobes, so as to generate a "Super Sand Castle" signal having three levels: a field blanking level, a line blanking level, greater than the field blanking level, and a burst gate level, greater than the line blanking level, wherein said "Super Sand Castle" signal generator also receives the signal containing said pulses having a level equal to the line blanking level so as to generate a "Super Sand Castle" signal modified by the insertion of said pulses, and wherein the device furthermore comprises a video processor which receives said modified "Super Sand Castle" signal and outputs to the electron gun of the cathode-ray tube a video signal having a level equal to the black level when the level of the "Super Sand Castle" signal is greater than a reference value lying between the zero level and the field blanking level.

6. The device according to claim 4, comprising a character generator which generates a character insertion signal and Text RGB signals which are delivered respectively to a first input and to second inputs of a video processor; and a microprocessor which controls both the character generator and the video processor and which receives the signal containing said pulses and instructs the character generator to insert said pulses into the text insertion signal delivered to a first input of the video processor so as to force said video processor to display the visual marks on the cathode-ray tube at the location of the picture points which remain stationary as the amplitude of the sinusoidal signal is varied.

7. A device for the S correction of the deformation of a picture formed by a cathode-ray tube, comprising means for generating the display of visual marks at the location of picture points which are not affected by said S correction, wherein the means for generating the display of visual marks comprise:

a sawtooth signal generator whose output is linked to the input of an S correction sinusoid generator, which also receives reference voltages as input and which outputs an S correction sinusoid which vanishes for input voltage values which are equal to the reference voltages, means for adding together the sawtooth signal delivered by the generator and said S correction sinusoid, means for comparing the sawtooth signal with each respectively of the reference voltages and for generating pulses at the instants at which the sawtooth signal passes respectively through each of the reference voltages; and means for displaying, as a function of the signal received containing said pulses, visual marks on the screen, at the location of the picture points which are not affected by the variation in amplitude of said S correction.

8. The device according to claim 7, comprising a "Super Sand Castle" signal generator which receives line blanking strobes, field blanking strobes and burst gate strobes, so as to generate a "Super Sand Castle" signal having three levels: a field blanking level, a line blanking level, greater than the field blanking level, and a burst gate level, greater than the line blanking level, wherein aid "Super Sand Castle" signal generator also receives the signal containing said pulses having a level equal to the line blanking level so as to generate a "Super Sand Castle" signal modified by the insertion of said pulses, and wherein the device furthermore comprises a video processor which receives said modified "Super Sand Castle" signal and outputs to the electron gun of the cathode-ray tube a video signal having a level equal to the black level when the level of the "Super Sand Castle" signal is greater than a reference value lying between the zero level and the field blanking level.

9. The device according to claim 7, comprising:

a character generator which generates a character insertion signal and Text RGB signals which are delivered respectively to a first input and to second inputs of a video processor;

a microprocessor which controls both the character generator and the video processor and which receives the signal containing said pulses and instructs the character generator to insert said pulses into the text insertion signal delivered to the first input of the video processor so as to force said video processor to display the visual marks on the screen at the location of the picture points which remain stationary as the amplitude of the S correction is varied.

10. A television with a cathode-ray tube comprising a device for the S correction of the deformation of a picture formed by said cathode-ray tube, wherein said device comprises means for generating the display of visual marks for marking the location of picture points which are not affected by said S correction.

11. A process for S distortion correction of a picture formed by a cathode-ray tube, comprising the steps of:

adding a sinusoidal signal to a saw tooth signal, wherein the signal resulting from the adding step drives deflection coils of the cathode-ray tube; and displaying visual marks on the cathode-ray tube for marking the location of picture points which remain stationary on said cathode-ray tube as an amplitude of said sinusoidal signal is varied.

12. The process according to claim 11, wherein said visual marks displayed are black lines.

13. The process according to claim 11, wherein said visual marks displayed are colored lines.

14. The process according to claim 11, wherein the step of displaying visual marks comprises:

the generation of pulses whose duration is at least equal to a video line at the instants at which the curve of the current flowing through the deflection coils passes through said stationary points; and the insertion of said pulses into a "Super Sand Castle" signal generated by a circuit controlling the scanning of the cathode-ray tube, said pulses indicating the position of those lines for which a black level is to be displayed on the cathode-ray tube.

15. The process according to claim 11, wherein the step of displaying visual marks comprises:

the generation of pulses whose duration is at least equal to a video line at the instants at which the curve of the current flowing through the deflection coils passes through said stationary points; and the insertion of said pulses into a text insertion signal generated by a character generator so as to control the displaying of characters at the locations of the picture on the cathode-ray tube corresponding to said stationary points.

16. A process for S distortion correction of a picture formed by a cathode-ray tube, comprising the steps of:

adding a sinusoidal signal to a saw tooth signal, wherein the signal resulting from the adding step drives deflection coils of the cathode-ray tube; and displaying visual marks on the cathode-ray tube for marking the location of picture points which remain stationary when an amplitude of said sinusoidal signal is varied, wherein the process is applied to the S correction in the vertical deflection circuit of the cathode-ray tube.

* * * * *